US011539859B2

(12) United States Patent
Nakatsuji et al.

(10) Patent No.: US 11,539,859 B2
(45) Date of Patent: Dec. 27, 2022

(54) IMAGE PROCESSING APPARATUS AND IMAGE FORMING APPARATUS

(71) Applicant: KYOCERA Document Solutions Inc., Osaka (JP)

(72) Inventors: Hiroomi Nakatsuji, Osaka (JP); Hiroki Sakane, Osaka (JP); Naoko Kawashima, Osaka (JP); Jun Nakano, Osaka (JP); Masato Usui, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/591,909

(22) Filed: Feb. 3, 2022

(65) Prior Publication Data
US 2022/0256052 A1    Aug. 11, 2022

(30) Foreign Application Priority Data
Feb. 8, 2021 (JP) .............................. JP2021-018311

(51) Int. Cl.
*H04N 1/405* (2006.01)
(52) U.S. Cl.
CPC .................... *H04N 1/405* (2013.01)
(58) Field of Classification Search
CPC ...................................................... H04N 1/405
See application file for complete search history.

(56) References Cited

U.S. PATENT DOCUMENTS

| 9,692,940 B2* | 6/2017 | Haruta ................. H04N 1/4092 |
| 2016/0072982 A1* | 3/2016 | Muraishi ............ G06K 15/1878 358/2.1 |

FOREIGN PATENT DOCUMENTS

JP       2018-160883       10/2018

\* cited by examiner

*Primary Examiner* — Quang N Vo

(57) ABSTRACT

An image processing apparatus includes a halftone processing unit and a multi-level gradation processing unit. The halftone processing unit is configured to perform a halftone process for a target image and generate a binary image corresponding to the target image. The multi-level gradation processing unit is configured to (a) set a target pixel as a dot pixel in the binary image, (b) determine whether a dot exists on plural first periphery pixels with a predetermined first distance from the target pixel and plural second periphery pixels with a predetermined second distance from the target pixel or not, (c) derive a gradation level of the target pixel among predetermined three or more gradation levels on the basis of a number of dots on the plural first periphery pixels and a number of dots on the plural second periphery pixels and thereby generate a multi-level gradation image.

7 Claims, 6 Drawing Sheets

FIG. 4

| GRADATION LEVEL | | NUMBER OF DOTS ON 1ST PERIPHERY PIXELS | | | | | | | | |
|---|---|---|---|---|---|---|---|---|---|---|
| | | 0 | 1 | 2 | 3 | 4 | 5 | 6 | 7 | 8 |
| NUMBER OF DOTS ON 2ND PERIPHERY PIXELS | 0 | 1 | 1 | 1 | 4 | 4 | 4 | 4 | 4 | 4 |
| | 1 | 1 | 1 | 1 | 2 | 2 | 4 | 4 | 4 | 4 |
| | 2 | 1 | 1 | 1 | 2 | 2 | 2 | 4 | 4 | 4 |
| | 3 | 1 | 1 | 1 | 2 | 2 | 2 | 2 | 4 | 4 |
| | 4 | 1 | 1 | 1 | 2 | 2 | 2 | 2 | 4 | 4 |
| | 5 | 1 | 1 | 1 | 2 | 2 | 2 | 2 | 3 | 4 |
| | 6 | 1 | 1 | 1 | 2 | 2 | 2 | 2 | 3 | 4 |
| | 7 | 1 | 1 | 1 | 2 | 2 | 2 | 2 | 3 | 4 |
| | 8 | 1 | 1 | 1 | 2 | 2 | 2 | 2 | 3 | 4 |
| | 9 | 1 | 1 | 1 | 2 | 2 | 2 | 2 | 3 | 4 |
| | 10 | 1 | 1 | 2 | 2 | 2 | 2 | 2 | 3 | 4 |
| | 11 | 2 | 2 | 2 | 2 | 2 | 2 | 2 | 3 | 4 |
| | 12 | 2 | 2 | 2 | 2 | 2 | 2 | 2 | 3 | 4 |
| | 13 | 4 | 3 | 3 | 3 | 3 | 3 | 3 | 3 | 4 |
| | 14 | 4 | 3 | 3 | 3 | 3 | 3 | 3 | 3 | 4 |
| | 15 | 4 | 4 | 4 | 4 | 4 | 4 | 4 | 4 | 4 |
| | 16 | 4 | 4 | 4 | 4 | 4 | 4 | 4 | 4 | 4 |

IMAGE PROCESSING APPARATUS AND IMAGE FORMING APPARATUS

CROSS-REFERENCE TO RELATED APPLICATIONS

This application relates to and claims priority rights from Japanese Patent Application No. 2021-018311, filed on Feb. 8, 2021, the entire disclosures of which are hereby incorporated by reference herein.

BACKGROUND

1. Field of the Present Disclosure

The present disclosure relates to an image processing apparatus and an image forming apparatus.

2. Description of the Related Art

An image processing apparatus adjusts a pixel density in an image obtained by a halftone process in order to restrain granularity due to an isolated dot in the image obtained by the halftone process.

However, in the aforementioned image processing apparatus, although the granularity due to such isolated dot is restrained through the density adjustment of the isolated dot, granularity due to a dot of another type may not be restrained.

SUMMARY

An image processing apparatus according to an aspect of the present disclosure includes a halftone processing unit and a multi-level gradation processing unit. The halftone processing unit is configured to perform a halftone process for a target image and generate a binary image corresponding to the target image. The multi-level gradation processing unit is configured to (a) set a tagged pixel as a dot pixel in the binary image, (b) determine whether a dot exists on plural first periphery pixels with a predetermined first distance from the target pixel and plural second periphery pixels with a predetermined second distance from the target pixel or not, (c) derive a gradation level of the target pixel among predetermined three or more gradation levels on the basis of a number of dots on the plural first periphery pixels and a number of dots on the plural second periphery pixels and thereby generate a multi-level gradation image.

An image forming apparatus according to an aspect of the present disclosure includes the aforementioned image processing apparatus and a printing device configured to print the multi-level gradation image.

These and other objects, features and advantages of the present disclosure will become more apparent upon reading of the following detailed description along with the accompanied drawings.

BRIEF DESCRIPTION OF THE DRAWINGS

FIG. 4 shows a diagram that indicates an example of a relationship between a gradation level of a target pixel and a combination of the number of dots on the first periphery pixels and the number of dots on the second periphery pixels for the target pixel;

DETAILED DESCRIPTION

Hereinafter, an embodiment according to an aspect of the present disclosure will be explained with reference to drawings.

Figure 1:
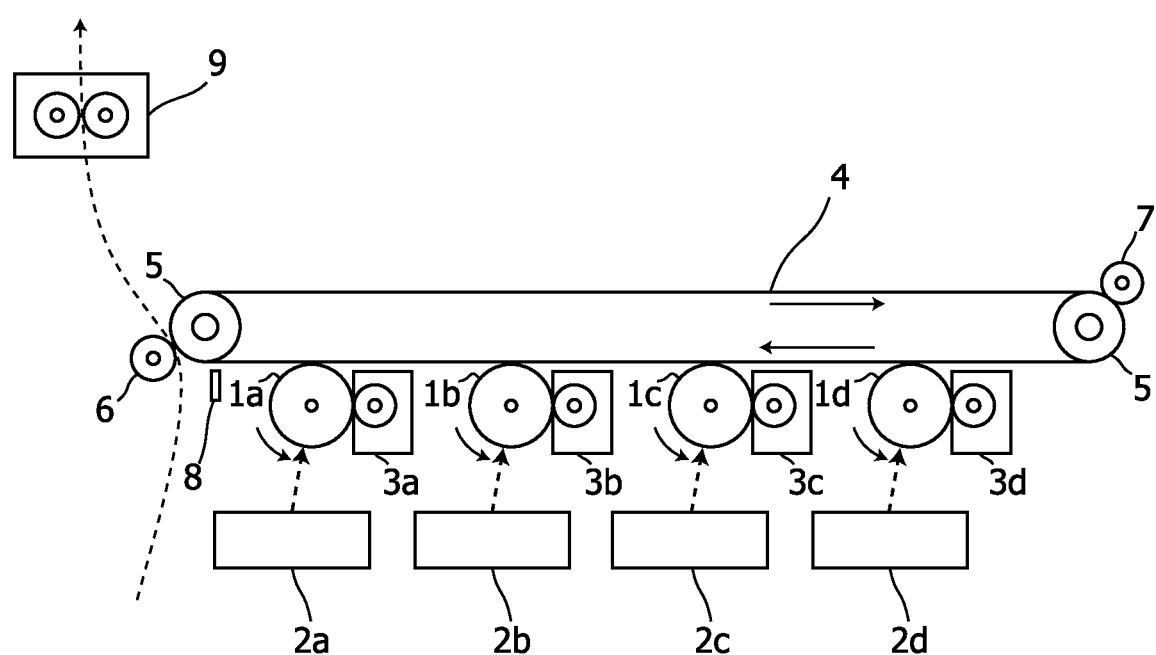
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus having an electrophotographic printing function, such as a printer, a facsimile machine, a copier or a multi function peripheral.

The image forming apparatus in this embodiment includes a tandem-type color development device. This color development device includes photoconductor drums $1a$ to $1d$, exposure devices $2a$ to $2d$, and development units $3a$ to $3d$. The photoconductor drums $1a$ to $1d$ are photoconductors of four toner colors: Cyan, Magenta, Yellow and Black.

The exposure devices $2a$ to $2d$ are devices that form electrostatic latent images by scanning and irradiating the photo conductor drums $1a$ to $1d$ with laser light, respectively. The photo conductor drum $1a$, $1b$, $1c$ or $1d$ is scanned with the laser light in a direction (a primary scanning direction) perpendicular to a rotation direction (a secondary scanning direction) of the photoconductor drum. The exposure devices $2a$ to $2d$ include laser scanning units that include laser diodes as light sources of the laser light, optical elements (such as lens, mirror and polygon mirror) that guide the laser light to the photoconductor drums $1a$ to $1d$, respectively.

Further, in a peripheral area of each one of the photo conductor drums $1a$ to $1d$, arranged are a charging unit such as scorotron, a cleaning device, a static electricity eliminator and the like. The cleaning device removes residual toner on each one of the photo conductor drums $1a$ to $1d$ after primary transfer. The static electricity eliminator eliminates static electricity of each one of the photoconductor drums $1a$ to $1d$ after primary transfer.

The development units $3a$ to $3d$ include respective toner containers filled with four color toner of Cyan, Magenta, Yellow and Black, and make the toner adhere to electrostatic latent images on the photoconductor drums $1a$ to $1d$ to form toner images. A developer is composed of the toner and a carrier with external additives such as titanium dioxide.

The photoconductor drum $1a$, the exposure device $2a$ and the development unit $3a$ perform development of Magenta. The photoconductor drum $1b$, the exposure device $2b$ and the development unit $3b$ perform development of Cyan. The photoconductor drum $1c$, the exposure device $2c$ and the development unit $3c$ perform development of Yellow. The photoconductor drum $1d$, the exposure device $2d$ and the development unit $3d$ perform development of Black.

An intermediate transfer belt 4 is a loop-shaped image carrier (here an intermediate transfer member), and contacts the photoconductor drums $1a$ to $1d$. Toner images on the photoconductor drums $1a$ to $1d$ are primarily transferred onto the intermediate transfer belt 4. The intermediate transfer belt 4 is hitched around driving rollers 5, and rotates by driving force of the driving rollers 5 towards the direction from the contact position with the photoconductor drum 1*d* to the contact position with the photoconductor drum 1*a*.

A transfer roller 6 causes an incoming paper sheet in transportation to contact the transfer belt 4, and secondarily transfers the toner image on the transfer belt 4 to the paper sheet. The printing sheet on which the toner image has been transferred is transported to a fuser 9, and consequently, the toner image is fixed on the printing sheet.

A roller 7 has a cleaning brush, and removes residual toner on the intermediate transfer belt 4 by contacting the cleaning brush to the intermediate transfer belt 4 after transferring the toner image to the paper sheet.

A sensor 8 irradiates the intermediate transfer belt 4 with a light beam, and detects its reflection light from a surface of the intermediate transfer belt 4 or a toner pattern on the intermediate transfer belt 4. For example, in toner density adjustment, the sensor 8 irradiates a predetermined area on the intermediate transfer belt 4 with a light beam, detects its reflection light, and outputs an electrical signal corresponding to the detected intensity of the reflection light.

Figure 2:
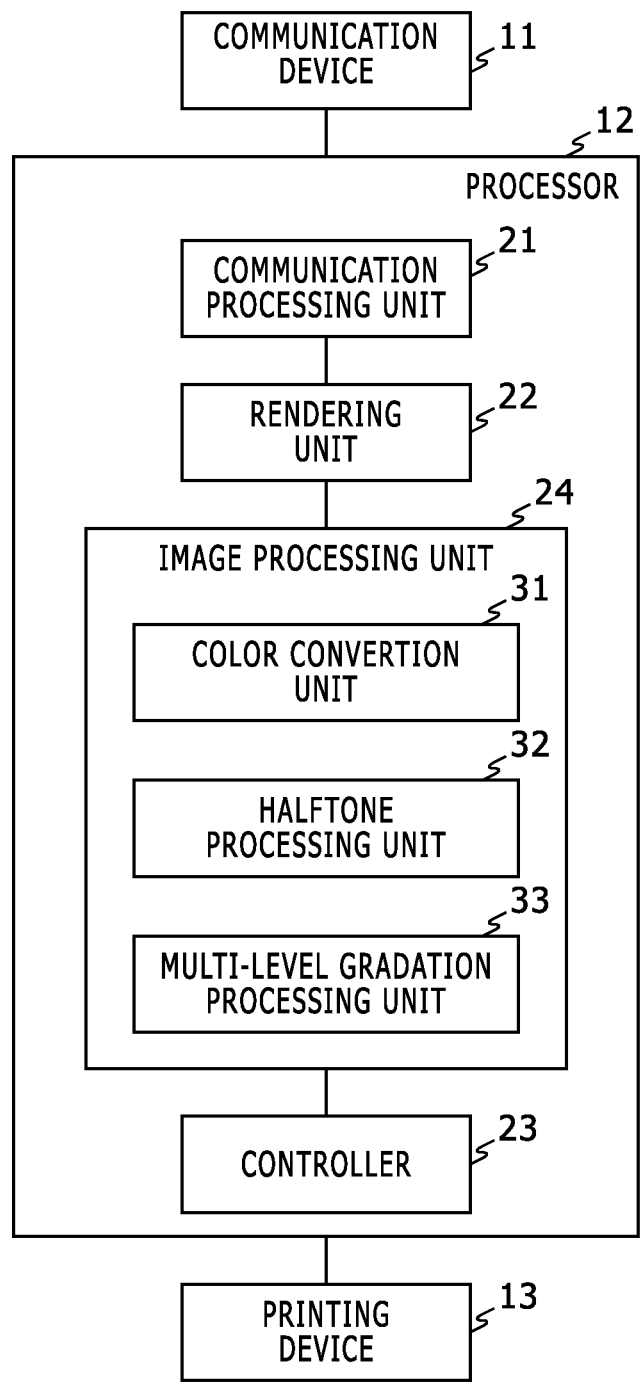
FIG. 2 shows a block diagram that indicates an electronic configuration of the image forming apparatus in the embodiment according to the present disclosure.

FIG. 2 shows a block diagram that indicates an electronic configuration of the image forming apparatus in the embodiment according to the present disclosure. As shown in FIG. 2, the image forming apparatus includes a communication device 11, a processor 12, and a printing device 13.

The communication device 11 is a device that is capable of connecting a host device through a network or a peripheral device interface and performs data communication according to a predetermined communication protocol.

Further, the processor 12 includes an ASIC (Application Specific Integrated Circuit) and/or a computer, and forms sorts of processing units as hardware and/or software. The computer includes a CPU (Central Processing Unit), a ROM (Read Only Memory), a RAM (Random Access Memory) and the like, loads a program from a storage device (not shown), the ROM or the like to the RAM, executes the program using the CPU, and thereby forms a processing unit as software.

Furthermore, the printing device 13 is an internal device that performs printing of a document image using a mechanical configuration shown in FIG. 1. The printing device 13 prints a multi-level gradation image mentioned below.

In this embodiment, the processor 12 acts as processing units that include a communication processing unit 21, a rendering unit 22, a controller 23, an image processing unit as an image processing apparatus according to the embodiment of the present disclosure.

The communication processing unit 21 is a processing unit that controls the communication device 11 and thereby performs data communication with a host device. For example, the communication processing unit 21 receives a document data as a print request from the host device.

Further the rendering unit 22 receives a print request based on a user operation to an operation panel or a print request provided from the host device, and performs a print job according to the request. For example, if document data in a predetermined data format such as PDL (Page Description Language) or PDF (Portable Document Format) is received as the print request, then the rendering unit 22 generates bitmap image data from the document data. This bitmap image data is 8-bit RGB data, for example. When receiving bitmap image data as the document data from the host device, the rendering unit 22 sets as the bitmap image data the received document data as is.

Furthermore, the controller 23 is a processing unit that watches and controls an internal device such as the printing device 13. The controller 23 is a processing circuit and controls a driving source that drives the aforementioned rollers, a bias induction circuit that induces a development bias and a primary transfer bias, and the exposure devices 2*a* to 2*d* in order to perform forming an electrostatic latent image, developing a toner image, transferring and fixing the toner image, feeding a sheet of paper, printing on the sheet, and outputting the sheet. The development biases are applied between the photoconductor drums 1*a* to 1*d* and the development units 3*a* to 3*d*, respectively. The primary transfer biases are applied between the photoconductor drums 1*a* to 1*d* and the intermediate transfer belt 4, respectively.

Furthermore, the image processing unit 24 performs predetermined image processes such as a color conversion (e.g. a color conversion from RGB data to CMYK data), a gamma correction, and halftone process, and thereby generates print data (for example, print image data that includes color planes of which each has been converted so as to have multi-level gradation (with three or more gradation levels)). The image processing unit 24 includes a color conversion unit 31, a halftone processing unit 32, and a multi-level gradation processing unit 33.

The color conversion unit 31 performs color conversion (here, color conversion from RGB data to CMYK data corresponding to the toner colors) for the image data generated by the rendering unit 22.

The halftone processing unit 32 performs a halftone process according to a predetermined halftone manner for the image data after the color conversion (i.e. image data of each color plane). Here the halftone processing unit 32 performs the halftone process for the target image (here, an image of each color plane) and thereby generates a binary image corresponding to the target image. Here the halftone processing unit 32 performs the halftone process according to an error diffusion method.

The multi-level gradation processing unit 33 (*a*) selects a dot pixel (i.e. a pixel with a density) as a target pixel in the aforementioned binary image in turn, (b) determines whether a dot exists on plural first periphery pixels with a predetermined first distance from the target pixel and plural second periphery pixels with a predetermined second distance from the target (the second distance>the first distance) or not, and (c) derives a gradation level of the target pixel among a predetermined three or more gradation levels on the basis of the number of dots on the first periphery pixels and the number of dots on the second periphery pixels, and thereby generates a multi-level gradation image corresponding to the target image.

Here, in the binary image, a pixel with a pixel value of 1 is the dot pixel as mentioned, and a pixel with a pixel value of 0 is called a non-dot pixel.

Figure 3:
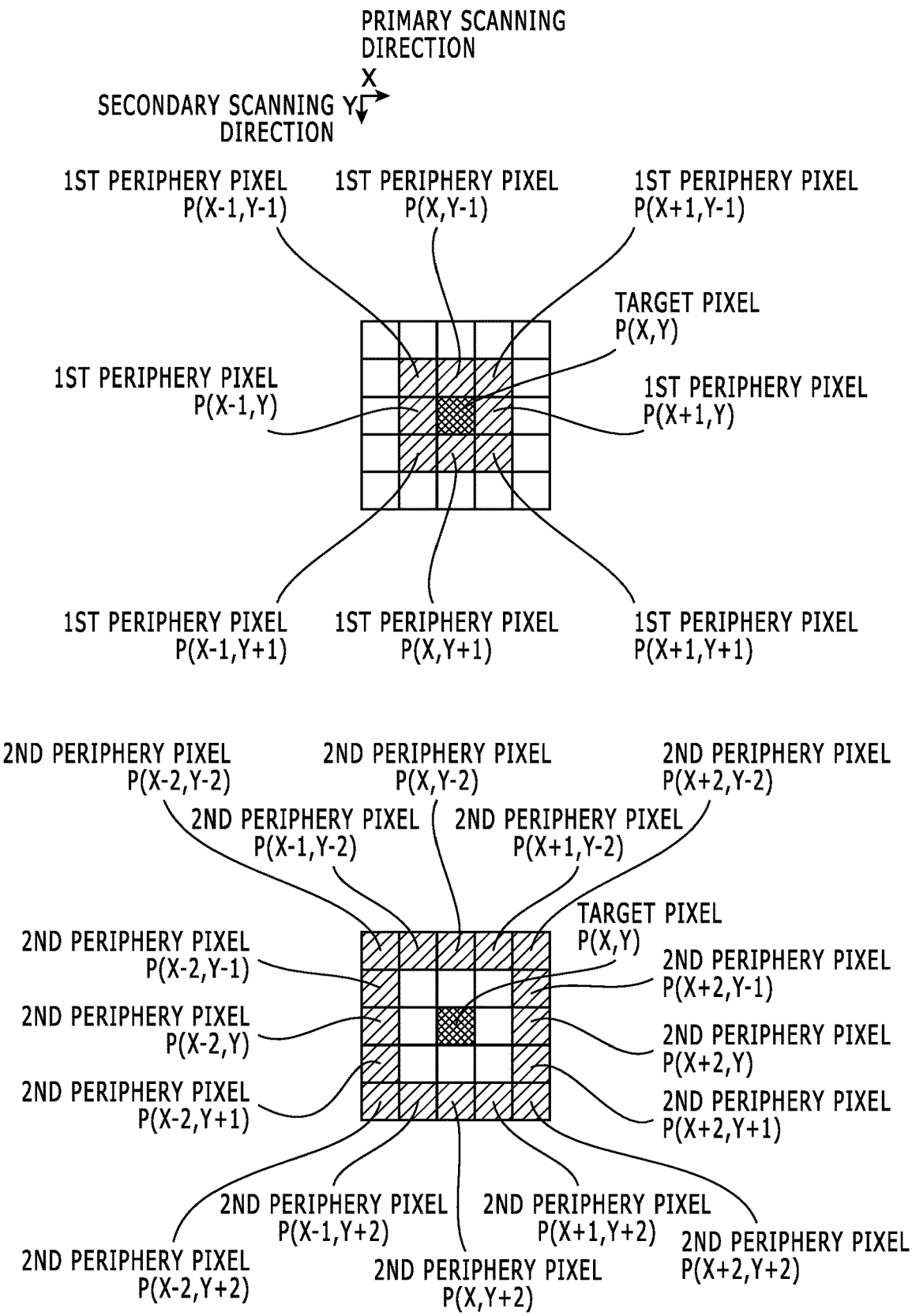
FIG. 3 shows a diagram that explains an example of first periphery pixels and second periphery pixels.

FIG. 3 shows a diagram that explains an example of the first periphery pixels and the second periphery pixels. For example, as shown in FIG. 3, in this embodiment, the first periphery pixels are outermost peripheral pixels in a pixel area of vertical 3 pixels by horizontal 3 pixels with a center set on the target pixel P(X,Y), and the second periphery pixels are outermost peripheral pixels in a pixel area of vertical 5 pixels by horizontal 5 pixels with a center set on the target pixel P(X,Y).

FIG. 4 shows a diagram that indicates an example of a relationship between a gradation level of a target pixel and a combination of the number of dots on the first periphery pixels and the number of dots on the second periphery pixels for the target pixel. The multi-level gradation processing unit 33 refers to a table as shown in FIG. 4, for example, and thereby determines a gradation level of the target pixel corresponding to a combination of the number of dots on the first periphery pixels and the number of dots on the second periphery pixels. This table has been stored in a non-volatile memory, and the multi-level gradation processing unit 33 reads the table from the non-volatile memory and uses the table to determine the gradation level of the target pixel.

For example, if the first and second periphery pixels are set as shown in FIG. 3, the number of the first periphery pixels is 8, and the number of the second periphery pixels is 16, and therefore the number of dots on the first periphery pixels is any number in a range from 0 to 8, and the number of dots on the second periphery pixels is any number in a range from 0 to 16.

For a certain number of dots on the first periphery pixels, the gradation level of the target pixel is set so as to get equal to or larger than that for a smaller number of dots on the first periphery pixels; and for a certain number of dots on the second periphery pixels, the gradation level of the target pixel is set so as to get equal to or larger than that for a smaller number of dots on the second periphery pixels. If all of the first periphery pixels are dot pixels, then the gradation level of the target pixel is set as a largest level (here, 4), regardless of the number of dots on the second periphery pixels. If all of the second periphery pixels are dot pixels, then the gradation level of the target pixel is set as a largest level (here, 4), regardless of the number of dots on the first periphery pixels.

Further, in this embodiment, the multi-level gradation processing unit 33 (a) determines whether a predetermined exception condition is satisfied on the target pixel P(X,Y) or not, and (b) performs an offset process that adjusts the derived gradation level, if the exception condition is satisfied on the target pixel P(X,Y). In the offset process, the gradation level is increased or decreased by an offset amount (constant) that has been set for the exception condition.

It should be noted that for each exception condition (a) the offset amount and (b) whether the gradation level is increased or decreased have been set; and if plural exception conditions are set, then (a) the offset amounts and (b) whether the gradation level is increased or decreased for the plural exception conditions may be different from each other.

Figure 5:
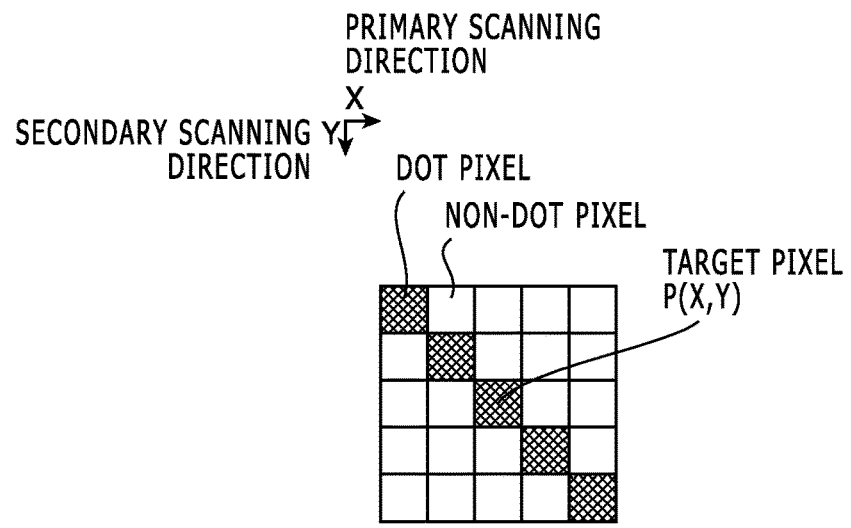
FIG. 5 shows a diagram that explains an example of an exception condition.
Figure 5:
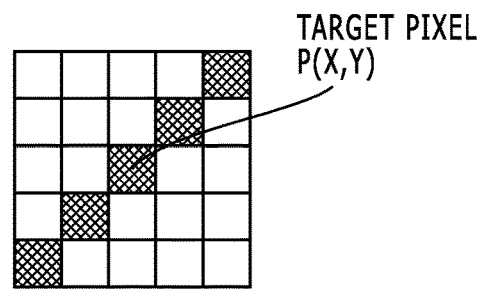
Figure 5:
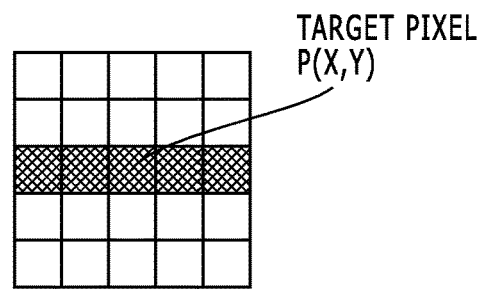
Figure 5:
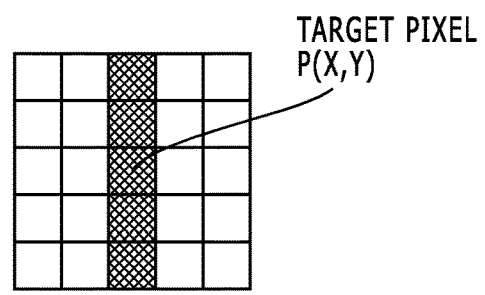

FIG. 5 shows a diagram that explains an example of the exception condition. Here the exception condition is, for example, as shown in FIG. 5, that the target pixel and dot pixels among peripheral pixels in a predetermined range from the target pixel appear in a straight line (in a vertical line, a horizontal line or an oblique line). Thus, this exception condition is that a predetermined number of dot pixels including the target pixel (5 pixels in FIG. 5) continue. This predetermined number may be 3. Further, in a pixel area having vertical and horizontal widths of respective predetermined pixel numbers, only if other pixels are non-dot pixels than the dot pixels including the target pixel, then it may be determined that this exception condition is satisfied. In addition, if this exception condition is satisfied on the target pixel, then the multi-level gradation processing unit 33 determines that the target pixel is a character pixel that is a part of a character, and performs the offset process corresponding to the character pixel.

Figure 6:
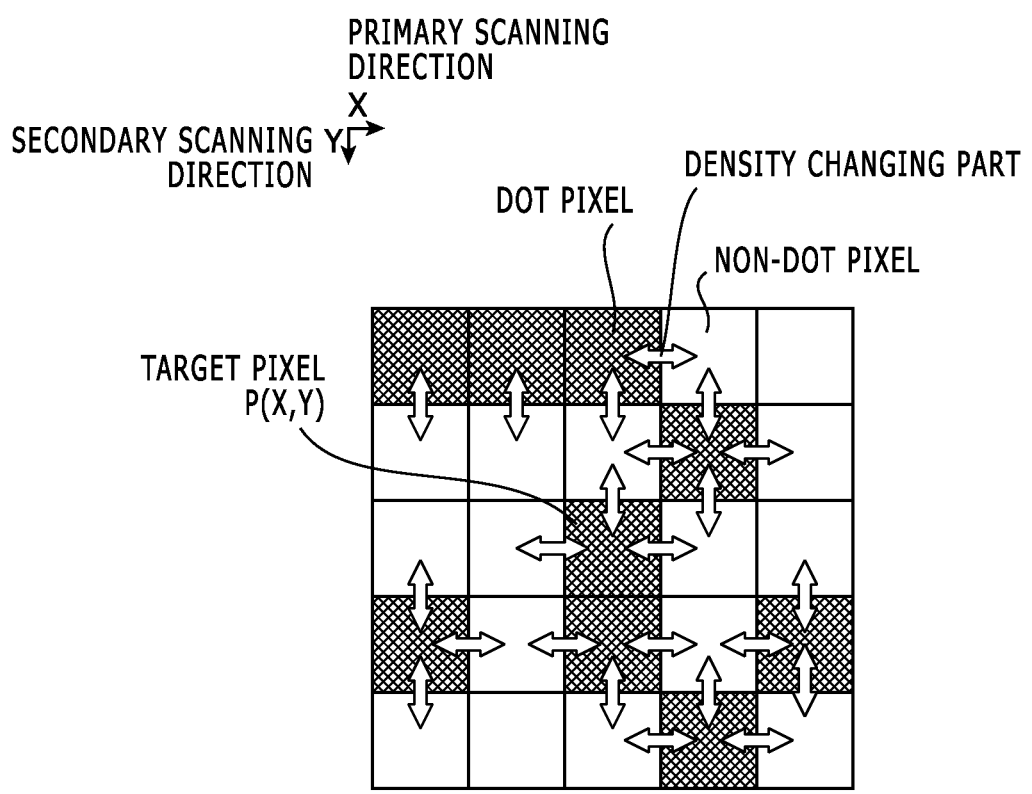
FIG. 6 shows a diagram that explains another example of an exception condition.

FIG. 6 shows a diagram that explains another example of the exception condition. Here the exception condition is that in a peripheral pixel area of a predetermined range from the target pixel, the number of parts in which a dot pixel and a non-dot pixel appear adjacent to each other (density changing parts in FIG. 6) excesses a predetermined threshold value. In addition, if this exception condition is satisfied on the target pixel, then the multi-level gradation processing unit determines that the target pixel is an intermediate gradation level pixel that is a part of a gradation image, and performs the offset process corresponding to the intermediate gradation level pixel.

In a part where a gradation level of the original target image is in a middle range, the number of the density changing parts gets large, and therefore for the target pixel in this part, the offset process corresponding to the intermediate gradation level pixel is performed for the target pixel. This threshold value is set so as to correspond to a size of this peripheral pixel area. In FIG. 6, for example, the number of the density changing parts in the peripheral pixel area of 5 pixels by 5 pixels is 23, and the offset process corresponding to the intermediate gradation level pixel is performed for the target pixel.

As mentioned, if plural exception conditions have been set, when one of the exception conditions is satisfied, the offset process corresponding to the satisfied exception condition is performed.

The following part explains a behavior of the aforementioned image forming apparatus.

The rendering unit 22 generates image data from a print request, and the color conversion unit 31 performs color conversion from the image data generated by the rendering unit to image data corresponding to the toner colors. The halftone processing unit 32 performs a halftone process (here, a halftone process based on an error diffusion method) for an image of each color plane (i.e. target image) obtained by the color conversion, and thereby generates a binary image.

Subsequently, the multi-level gradation processing unit 33 converts the binary image to a multi-level gradation image with the number N (N>2) of predetermined gradation levels. In this process, as mentioned, the multi-level gradation processing unit 33 selects a dot pixel (i.e. a pixel with a pixel value of 1) in the binary image in turn, and converts the pixel value of the selected pixel to any gradation level i in a gradation range from 1 to (N−1) (0<i<N). Further, in this process, if the aforementioned exception condition is satisfied on the selected pixel, then the multi-level gradation processing unit 33 performs the offset process corresponding to the exception condition and adjusts the gradation level of this pixel. Thus, the multi-level gradation image is generated. Here a non-dot pixel in the binary image is converted to a pixel with a gradation level (pixel value) of 0 in the multi-level gradation image.

Afterward the controller 23 controls the printing device 13 on the basis of print image data after the image process performed by the image processing unit 24 and thereby performs printing of the multi-level gradation image.

As mentioned, in the aforementioned embodiment, the halftone processing unit 32 performs a halftone process for a target image and generates a binary image corresponding to the target image. The multi-level gradation processing unit 33 (a) sets a target pixel as a dot pixel in the binary image, (b) determines whether a dot exists on plural first periphery pixels with a predetermined first distance from the target pixel and plural second periphery pixels with a predetermined second distance from the target pixel or not, (c) derives a gradation level of the target pixel among predetermined three or more gradation levels on the basis of a number of dots on the plural first periphery pixels and a number of dots on the plural second periphery pixels and thereby generates a multi-level gradation image.

Consequently, a density of the target pixel is adjusted so as to correspond to a dot distribution situation in a periphery of the target pixel, and therefore more granularity due to a cause not limited to an isolated dot is restrained on the multi-level gradation image.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, the feature of the present disclosure may also be applied to a monochrome image forming apparatus.

Further, an image processing apparatus may be embodied as an information processing apparatus that acts as the image processing unit 24 in the aforementioned embodiment.

In such a case, the printing device 13 may not be required.

What is claimed is:

1. An image processing apparatus, comprising:
   a halftone processing unit configured to perform a halftone process for a target image and generate a binary image corresponding to the target image; and
   a multi-level gradation processing unit configured to (a) set a target pixel as a dot pixel in the binary image, (b) determine whether a dot exists on plural first periphery pixels with a predetermined first distance from the target pixel and plural second periphery pixels with a predetermined second distance from the target pixel or not, (c) derive a gradation level of the target pixel among predetermined three or more gradation levels on the basis of a number of dots on the plural first periphery pixels and a number of dots on the plural second periphery pixels and thereby generate a multi-level gradation image.

2. The image processing apparatus according to claim 1, wherein the multi-level gradation processing unit (a) determines whether a predetermined exception condition is satisfied on the target pixel or not, and (b) performs an offset process, if the exception condition is satisfied on the target pixel;
   the offset process adjusts the derived gradation level; and
   the exception condition is that the target pixel and dot pixels among peripheral pixels in a predetermined range from the target pixel appear in a straight line.

3. The image processing apparatus according to claim 2, wherein if the exception condition is satisfied on the target pixel, the multi-level gradation processing unit determines that the target pixel is a character pixel that is a part of a character, and performs the offset process corresponding to the character pixel.

4. The image processing apparatus according to claim 1, wherein the multi-level gradation processing unit (a) determines whether a predetermined exception condition is satisfied on the target pixel or not, and (b) performs an offset process, if the exception condition is satisfied on the target pixel;
   the offset process adjusts the derived gradation level; and
   the exception condition is that in a peripheral pixel area of a predetermined range from the target pixel, a number of parts in which a dot pixel and a non-dot pixel appear adjacent to each other excesses a predetermined threshold value.

5. The image processing apparatus according to claim 4, wherein if the exception condition satisfies on the target pixel, the multi-level gradation processing unit determines that the target pixel corresponds to an intermediate gradation level pixel that is a part of a gradation image, and performs the offset process corresponding to the intermediate gradation level pixel.

6. The image processing apparatus according to claim 1, wherein the first periphery pixels are outermost peripheral pixels in a pixel area of vertical 3 pixels by horizontal 3 pixels with a center set on the target pixel; and
   the second periphery pixels are outermost peripheral pixels in a pixel area of vertical 5 pixels by horizontal 5 pixels with a center set on the target pixel.

7. An image forming apparatus, comprising:
   an image processing apparatus; and
   a printing device configured to print a multi-level gradation image;
   wherein the image processing apparatus comprises:
   a halftone processing unit configured to perform a halftone process for a target image and generate a binary image corresponding to the target image; and
   a multi-level gradation processing unit configured to (a) set a target pixel as a dot pixel in the binary image, (b) determine whether a dot exists on plural first periphery pixels with a predetermined first distance from the target pixel and plural second periphery pixels with a predetermined second distance from the target pixel or not, (c) derive a gradation level of the target pixel among predetermined three or more gradation levels on the basis of a number of dots on the plural first periphery pixels and a number of dots on the plural second periphery pixels and thereby generate the multi-level gradation image.

* * * * *